(12) United States Patent
Wang

(10) Patent No.: US 11,779,960 B2
(45) Date of Patent: Oct. 10, 2023

(54) SORTING SYSTEM

(71) Applicant: BEIJING JINGDONG QIANSHI TECHNOLOGY CO., LTD., Beijing (CN)

(72) Inventor: Guopeng Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 126 days.

(21) Appl. No.: 17/605,629

(22) PCT Filed: Mar. 13, 2020

(86) PCT No.: PCT/CN2020/079122
§ 371 (c)(1),
(2) Date: Oct. 22, 2021

(87) PCT Pub. No.: WO2020/220844
PCT Pub. Date: Nov. 5, 2020

(65) Prior Publication Data
US 2022/0219200 A1 Jul. 14, 2022

(30) Foreign Application Priority Data
Apr. 29, 2019 (CN) .......................... 201910352473.0

(51) Int. Cl.
*B07C 3/08* (2006.01)
*B07C 3/14* (2006.01)

(52) U.S. Cl.
CPC . *B07C 3/08* (2013.01); *B07C 3/14* (2013.01)

(58) Field of Classification Search
CPC .... B07C 3/08; B07C 3/14; B07C 5/36; B65G 21/22; B65G 23/44; B65G 47/22;
(Continued)

(56) References Cited

U.S. PATENT DOCUMENTS

| 3,658,170 A | 4/1972 | Wilson |
| 7,233,840 B2 | 6/2007 | Schiesser et al. |

(Continued)

FOREIGN PATENT DOCUMENTS

| CN | H08310617 A | 11/1996 | |
| CN | 19957841 A1 * | 6/2001 | ............... B07C 3/08 |

(Continued)

OTHER PUBLICATIONS

The First Office Action dated Mar. 8, 2022 of Chinese Patent Application No. 201910352473.0.

(Continued)

*Primary Examiner* — Gene O Crawford
*Assistant Examiner* — Muhammad Awais
(74) *Attorney, Agent, or Firm* — Qinghong Xu

(57) ABSTRACT

A sorting system, comprising: a conveying mechanism (1) and a control system (2). The conveying mechanism comprises: a rack (11); two rollers (15, 16) arranged on the rack at intervals along a first horizontal direction; a chain (12) wound around the two rollers; and a plurality of trolleys (13) respectively connected to the chain and sequentially arranged along the first horizontal direction. Each trolley comprises a trolley body (131) and a sorting and conveying mechanism (132) arranged on the trolley body, and the bottom of the trolley body is connected to the chain.

19 Claims, 10 Drawing Sheets

(58) Field of Classification Search
CPC ............ B65G 47/2445; B65G 2207/18; B65G 17/345; B65G 47/96
USPC ........................................................ 209/584
See application file for complete search history.

(56) References Cited

U.S. PATENT DOCUMENTS

| | | | | |
|---|---|---|---|---|
| 2003/0221935 | A1* | 12/2003 | Barklin .................. | B65G 47/96 209/559 |
| 2010/0022358 | A1* | 1/2010 | Schwaiger ......... | A63B 22/0242 482/54 |
| 2016/0039611 | A1* | 2/2016 | Hoynash .............. | B65G 17/345 209/552 |
| 2016/0325937 | A1* | 11/2016 | Bastian, II ............. | B65G 43/08 |
| 2018/0354730 | A1* | 12/2018 | Lykkegaard ........... | B65G 54/02 |

FOREIGN PATENT DOCUMENTS

| | | | | | |
|---|---|---|---|---|---|
| CN | 203699238 | U | * | 7/2014 | |
| CN | 203699238 | U | | 7/2014 | |
| CN | 105797963 | A | | 7/2016 | |
| CN | 105797963 | A | * | 7/2016 | |
| CN | 205797786 | U | | 12/2016 | |
| CN | 205797786 | U | * | 12/2016 | |
| CN | 106311618 | A | | 1/2017 | |
| CN | 106311618 | A | * | 1/2017 | |
| CN | 106628858 | A | * | 5/2017 | |
| CN | 106628858 | A | | 5/2017 | |
| CN | 106956887 | A | * | 7/2017 | ............... B07C 3/08 |
| CN | 106984550 | A | | 7/2017 | |
| CN | 106984550 | A | * | 7/2017 | |
| CN | 206447153 | U | * | 8/2017 | |
| CN | 206447153 | U | | 8/2017 | |
| CN | 107202137 | A | * | 9/2017 | |
| CN | 107202137 | A | | 9/2017 | |
| CN | 107350166 | A | * | 11/2017 | |
| CN | 107362979 | A | | 11/2017 | |
| CN | 107362979 | A | * | 11/2017 | |
| CN | 107377401 | A | * | 11/2017 | ............... B07C 3/08 |
| CN | 107442438 | A | | 12/2017 | |
| CN | 107442438 | A | * | 12/2017 | |
| CN | 206735181 | U | | 12/2017 | |
| CN | 107738862 | A | * | 2/2018 | ............. B65G 17/12 |
| CN | 107738862 | A | | 2/2018 | |
| CN | 108275417 | A | * | 7/2018 | ............. B65G 23/44 |
| CN | 108275417 | A | | 7/2018 | |
| CN | 108636815 | A | | 10/2018 | |
| CN | 108636815 | A | * | 10/2018 | ............... B07C 3/02 |
| CN | 108686965 | A | * | 10/2018 | ............. B07C 3/008 |
| CN | 108750545 | A | | 11/2018 | |
| CN | 108820816 | A | * | 11/2018 | |
| CN | 108820816 | A | | 11/2018 | |
| CN | 208084117 | U | | 11/2018 | |
| CN | 208413012 | U | | 1/2019 | |
| CN | 208413012 | U | * | 1/2019 | |
| DE | 4443207 | A1 | | 6/1995 | |
| DE | 19957841 | A1 | * | 6/2001 | ............... B07C 3/08 |
| DE | 202012004830 | U1 | * | 8/2012 | ........... B65G 17/345 |
| EP | 1205266 | A1 | | 5/2002 | |
| EP | 2295155 | A1 | * | 3/2011 | ............... B07C 3/06 |
| GB | 863993 | A | | 3/1961 | |
| JP | S58004521 | U | | 1/1983 | |
| JP | S6112552 | A | | 1/1986 | |
| JP | 2003321186 | A | | 11/2003 | |
| JP | 2017075011 | A | | 4/2017 | |
| WO | 0018666 | A1 | | 4/2000 | |

OTHER PUBLICATIONS

The International Search Report dated Apr. 29, 2020 for PCT international application No. PCT/CN2020/079122.
Extended European Search Report dated Dec. 14, 2022 for European Application No. 20799357.7.
2nd Office Action dated Aug. 24, 2022 of Chinese Application No. 201910352473.0.
Notice of Reasons for Refusal dated Oct. 25, 2022 of Japanese Application No. 2021-564395.
Notice of Allowance dated Mar. 28, 2023 of Japanese Application No. 2021-564395.

* cited by examiner

US 11,779,960 B2

SORTING SYSTEM

CROSS REFERENCE TO RELATED APPLICATION

The present disclosure a 35 U.S.C. 371 national phase application of PCT International Application No. PCT/CN2020/079122 filed on Mar. 13, 2020, which claims the priority of a Chinese patent application with an application number of 201910352473.0 and a name of "sorting system" filed on Apr. 29, 2019, the entire contents of both are incorporated herein by reference in its entirety.

TECHNICAL FIELD

The present disclosure relates to the technical field of logistics devices, and in particular to a sorting system.

BACKGROUND

In the logistics industry, when sorting packages, cross-belt sorters are usually used. Currently, the most commonly used sorters are circular cross-belt sorters and vertical cross-belt sorters. The cross-belt sorter is a closed conveying and sorting system composed of a group of trolleys, generally in a ring shape. Each trolley moves along a rail, and the surface belt of the trolley can rotate in the horizontal and vertical direction with respect to the movement of the trolley, so as to put the package into the respective grid. However, the circular cross-belt sorter and the vertical cross-belt sorter as currently used have a long turning radius and a long trolley pitch (where a trolley pitch refers to the distance between the central axis of two adjacent trolleys), which is usually 600 mm. In this case, a small package also needs to occupy a trolley, resulting in a waste of transportation resources. In addition, when packages are transported on a trolley, they may be skewed thus causing throwing troubles. If the trolley pitch is large, a trolley only carries one package, which renders it difficult to achieve automatic package correction, and the correction will be not accurate.

SUMMARY

According to one aspect of the present disclosure, there is provided a sorting system for conveying a package. The sorting system includes a conveying mechanism and a control system. The conveying mechanism comprises a rack, two rollers, a chain and a plurality of trolleys. Two rollers are arranged on the rack at intervals along a first horizontal direction. The chain is wound around the two rollers. The plurality of trolleys are respectively connected to the chain and arranged in sequence along the first horizontal direction. Each of the trolleys includes a trolley body and a sorting and conveying mechanism provided on the trolley body. The bottom part of the trolley body is connected to the chain. The sorting and conveying mechanism is configured to carry and convey the package in a second horizontal direction perpendicular to the first horizontal direction. The control system includes a controller connected to the conveying mechanism. The controller is configured to control the conveying mechanism to transport the package in the first horizontal direction, and is configured to independently control the sorting and conveying mechanism of each trolley to convey the package along the second horizontal direction.

According to an embodiment of the present disclosure, the sorting and conveying mechanism includes a driving roller, a tension roller, and a conveying belt. The driving roller is provided on the trolley body. The tension roller is arranged on the trolley body and is spaced apart from the driving roller. The conveying belt is wound around the driving roller and the tension roller. The controller is configured to control the driving roller, such that the forward or reverse movement of the conveying belt in the second horizontal direction is controlled to adjust the position of the package.

According to an embodiment of the present disclosure, each trolley further includes wheels arranged on respective sides of the trolley body, and the rack includes an upper rail arranged on the inner side of the upper part of the rack. The wheels are slidingly fitted with the upper rail.

According to an embodiment of the present disclosure, each trolley further includes wheels arranged on respective sides of the trolley body, the rack includes a lower rail, and the lower rail is arranged on the inner side of the lower part of the rack. The wheels are slidingly fitted with the lower rail.

According to an embodiment of the present disclosure, each wheel includes a wheel body and a wheel shaft. The wheel shaft is penetrated through the wheel body, and the gap between the end of the wheel shaft close to the rack and the inner side of the rack is 1 to 5 mm.

According to an embodiment of the present disclosure, the end surface of the wheel shaft at an end close to the rack is a curved surface.

According to an embodiment of the present disclosure, the rack further includes an upper cover and a wear-resistant strip. One side of the upper cover is arranged on the rack, and the other side of the upper cover extends above the upper rail to cover the wheels on the upper rail. The wear-resistant strip is made of wear-resistant material. The wear-resistant strip is arranged inside the rack along the first horizontal direction and is located between the upper cover and the upper rail. The wear-resistant strip is configured to prevent the wheel shaft and the inner side of the rack from wearing.

According to an embodiment of the present disclosure, the wear-resistant material is ultra-high molecular weight polyethylene.

According to an embodiment of the present disclosure, the rack further includes shock-absorbing feet arranged on respective sides of the rack to support the rack.

According to an embodiment of the present disclosure, the conveying mechanism further includes a connecting piece, and the chain is connected to the bottom part of each trolley through the connecting piece.

According to an embodiment of the present disclosure, one of the two rollers is an active roller, and the other of the two rollers is a passive roller. The active roller includes a driving sprocket, a bearing seat, a driving shaft, and a driving motor. The driving sprocket meshes with the chain. The bearing seat is arranged on the rack. The driving shaft is penetrated through the center part of the driving sprocket, and has both ends penetrated into the bearing seat. The driving motor is in a transmission connection with the driving shaft and is configured to drive the driving shaft to rotate and drive the driving sprocket to rotate.

According to an embodiment of the present disclosure, one of the two rollers is an active roller, and the other of the two rollers is a passive roller. The passive roller includes a tension sprocket, a tension shaft, and a tension assembly. The tension sprocket meshes with the chain. The tension shaft passes through the center part of the tension sprocket. The tension assembly is connected to an end of the tension shaft, and is configured to adjust the tension degree of the chain by adjusting the displacement of the tension shaft in the first horizontal direction.

According to an embodiment of the present disclosure, the tension assembly includes a sliding rail, a tension spring, a tension rod, and an elasticity adjustment component. The sliding rail is arranged on the rack along the first horizontal direction, and the sliding rail is provided with a sliding groove. The tension spring is connected to one end of the sliding rail along the first horizontal direction. The tension rod passes through the sliding rail and the tension spring in sequence along the first horizontal direction. The elasticity adjustment component is arranged at an end of the tension spring away from the sliding rail, connects the tension rod and the tension spring, and compresses or stretches the tension spring. An end of the tension rod is connected with the tension shaft, and the end of the tension shaft is slidably arranged in the sliding groove.

According to an embodiment of the present disclosure, the conveying mechanism further includes a first shock-absorbing rail, which is arranged inside the rack and extends along the end of the lower rail. The upper surface of the first shock-absorbing rail is gradually reduced to a wedge-shaped surface from the upper surface of the lower rail, so that the wheels of each trolley are transitioned to the lower rail for sliding.

According to an embodiment of the present disclosure, the conveying mechanism further includes a second shock-absorbing rail, which is arranged inside the rack and extends along the end of the upper rail. The upper surface of the second shock-absorbing rail is gradually reduced to a wedge-shaped surface from the upper surface of the upper rail, so that the wheels of each trolley are transitioned to the upper rail for sliding.

According to an embodiment of the present disclosure, the control system further includes a data acquisition module. The data acquisition module includes a code scanner, which is electrically connected to the controller. The data acquisition module is configured to collect the sorting information of the package and transmit it to the controller. The controller is configured to control the rollers and the sorting and conveying mechanism of the trolley according to the sorting information, so that the package is thrown to a designated throwing grid.

According to an embodiment of the present disclosure, the data acquisition module further includes a position sensor, electrically connected to the controller, and configured to detect the first position information of the package at the initial position. The controller is configured to respectively control the sorting and conveying mechanism of each trolley according to the first position information to adjust the position of the package.

According to an embodiment of the present disclosure, the data acquisition module further includes a detection sensor, electrically connected to the controller, and configured to detect the second position information of the package in the adjustment position. The controller is configured to control the sorting and conveying mechanism of each trolley according to the second position information of the package, so as to assist in adjusting the position of the package.

According to an embodiment of the present disclosure, one of the two rollers is an active roller, and the other of the two rollers is a passive roller. The passive roller includes a tension shaft and a tension assembly. The tension assembly is connected to the end of the tension shaft and configured to adjust the tension degree of the chain by adjusting the displacement of the tension shaft in the first horizontal direction. The data acquisition module further includes a tension sensor, connected to the controller, arranged on the rack, being opposite to the tension assembly in the first horizontal direction, and configured to detect the distance between tension sensor and the tension assembly.

According to an embodiment of the present disclosure, the tension assembly includes a tension rod, arranged along the first horizontal direction, and having two ends, i.e., a first end and a second end respectively. The first end is connected to the end of the tension shaft, so that the end of the tension shaft slides along the first horizontal direction. The data acquisition module further includes a sensing piece arranged at the second end of the tension rod. The tension sensor is opposite to the sensing piece in the first horizontal direction and is configured to detect the distance between the tension sensor and the sensing sheet.

According to an embodiment of the present disclosure, the sorting system further includes a package supply mechanism. The package supply mechanism includes a package supply rack and a package supply belt. The package supply belt is arranged on the package supply rack and is configured to convey the package to the trolleys.

In the present disclosure, through the following description of preferred embodiments with reference to the accompanying drawings, the above and other objectives, features and advantages of the present disclosure will be more apparent.

BRIEF DESCRIPTION OF THE DRAWINGS

By considering the following detailed description of the preferred embodiments of the present disclosure in conjunction with the accompanying drawings, various objectives, features, and advantages of the present disclosure will become more apparent. The drawings are merely exemplary illustrations of the present disclosure, and are not necessarily drawn to scale. In the drawings, the same reference numerals always refer to the same or similar parts. In the drawings.

Figure 1:
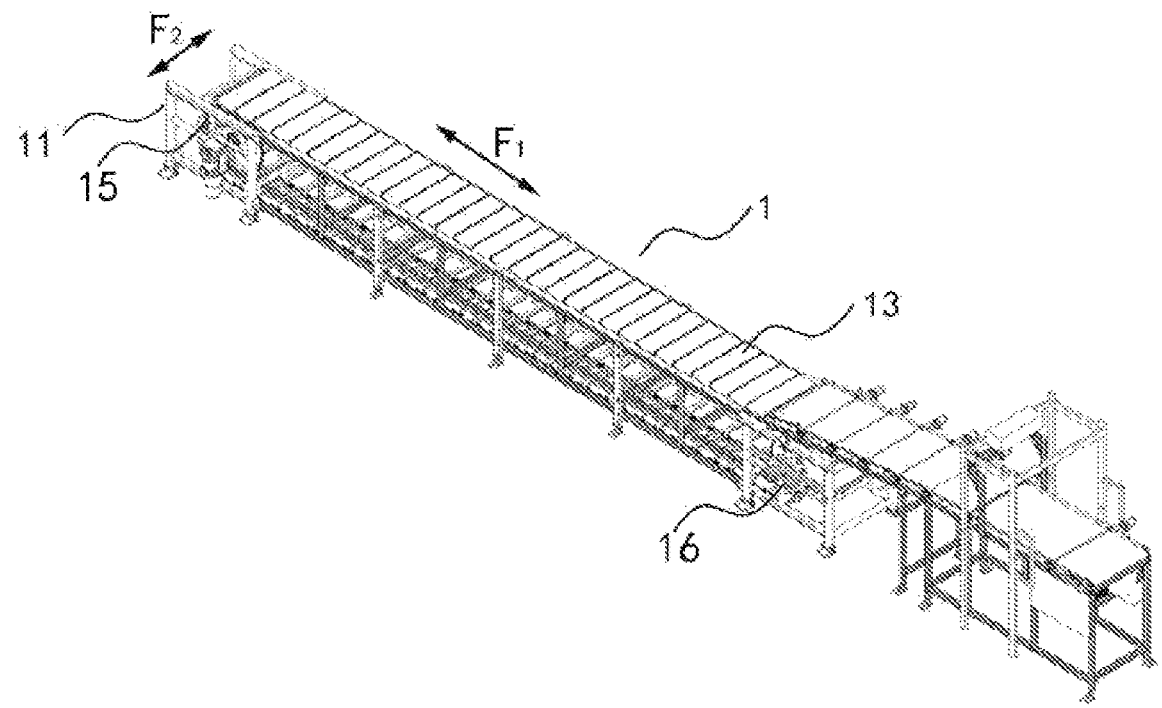
FIG. 1 is a three-dimensional schematic diagram of a sorting system in an embodiment of the present disclosure.

In the drawings, the reference signs are explained as follows:

1, conveying mechanism; 11, rack; 111, upper rail; 112, lower rail; 113, shock-absorbing feet; 114, upper cover; 115, wear-resistant strip; 12, chain; 13, trolley; 131, trolley body; 132, sorting and conveying mechanism; 1321, driving roller; 1322, tension roller; 1323, conveying belt; 133, wheel; 1331, wheel body; 1332, wheel shaft; 14, guide table; 15, 16, roller; 151, active roller; 1511, driving sprocket; 1512, driving shaft; 1513, bearing seat; 1514, driving motor; 161, passive roller; 1611, tension sprocket; 1612, tension shaft; 1613, tension assembly; 16131, sliding rail; 16132, sliding groove; 16133, opening; 16134, tension spring; 16135, cavity; 16136, tension rod; 16137, elasticity adjustment component; 16138, baffle; 17, connecting piece; 18, first shock-adsorbing rail; 19, second shock-adsorbing rail;

2, control system; 21, controller; 22, data acquisition module; 221, code scanner; 222, position sensor; 224, tension sensor; 225, sensing piece; 226, sliding contact wire; 227, electric pickup set; 228, external antenna; 229, signal transceiver; 230, actuator; 231, first-trolley sensing piece; 232, first-trolley detection sensor; 233, driving encoder;

3, package supply mechanism; 31, package supply rack; 32, package supply belt;

4, package;

F1, first horizontal direction;

F2, second horizontal direction.

DETAILED DESCRIPTION OF THE EMBODIMENTS

Typical embodiments embodying the features and advantages of the present disclosure will be described in detail in the following description. It should be understood that the present disclosure can have various changes in different embodiments, which do not depart from the scope of the present disclosure. The description and drawings therein are essentially for illustrative purposes, rather than limiting the present disclosure.

In the following description of the different exemplary embodiments of the present disclosure, it is made with reference to the accompanying drawings, which form a part of the present disclosure, and in which different exemplary structures, systems and steps that can implement various aspects of the present disclosure are shown by way of example. It should be understood that other specific solutions of components, structures, exemplary devices, systems, and steps may be used, and structural and functional modifications may be made without departing from the scope of the present disclosure. Moreover, although the terms "upper end", "lower end", "between", "side", etc. may be used in the present specification to describe different exemplary features and elements of the present disclosure, these terms are used herein only for convenience, for example, based on the example directions described in the drawings. Nothing in the present specification should be understood as requiring a specific three-dimensional direction of any structure to fall within the scope of the present disclosure.

Figure 2:
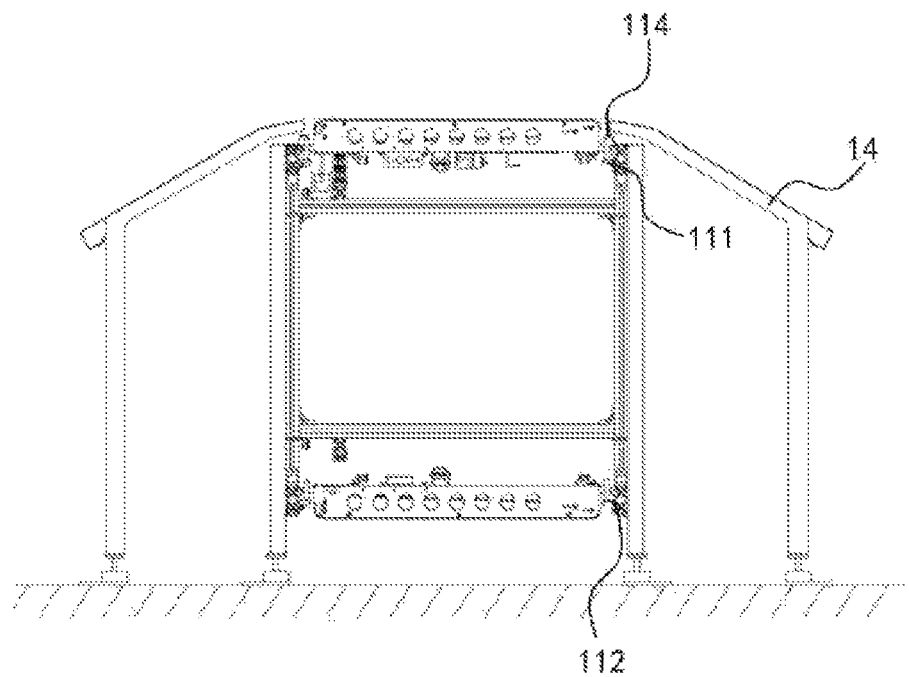
FIG. 2 is a schematic diagram of a side structure of a rack and a trolley in an embodiment of the present disclosure.
Figure 3:
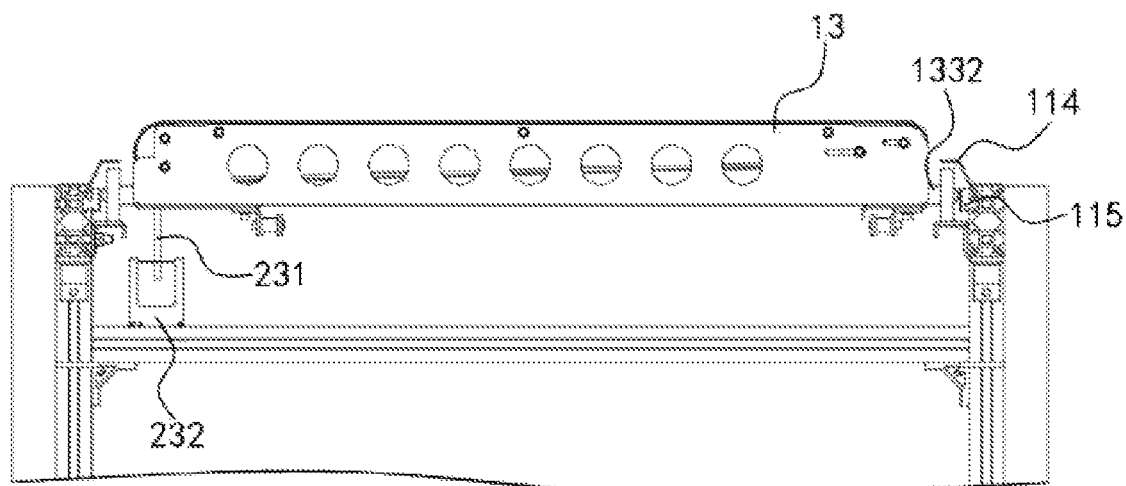
FIG. 3 is a partial structural diagram of the rack and the trolley in FIG. 2.
Figure 4:
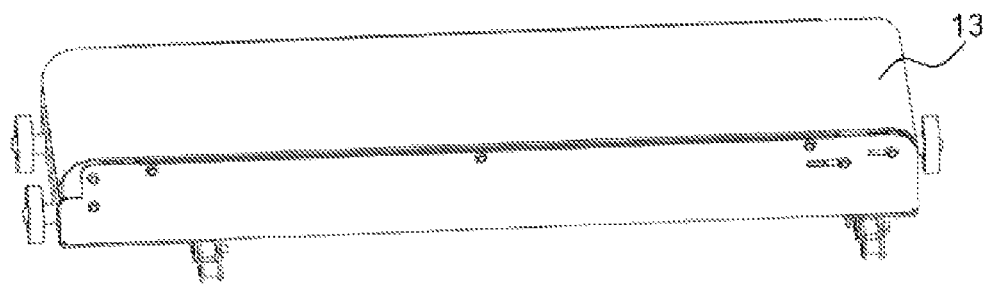
FIG. 4 is a three-dimensional structural schematic diagram of a trolley in an embodiment of the present disclosure.
Figure 5:
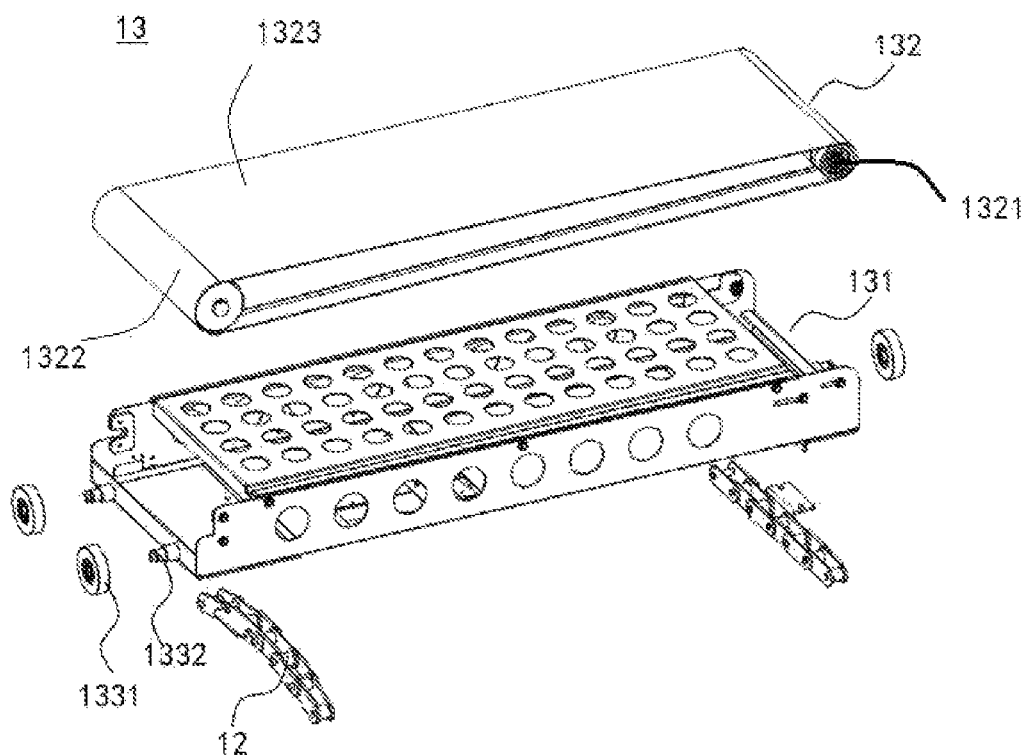
FIG. 5 is an exploded structural schematic diagram of the trolley in FIG. 4.
Figure 6:
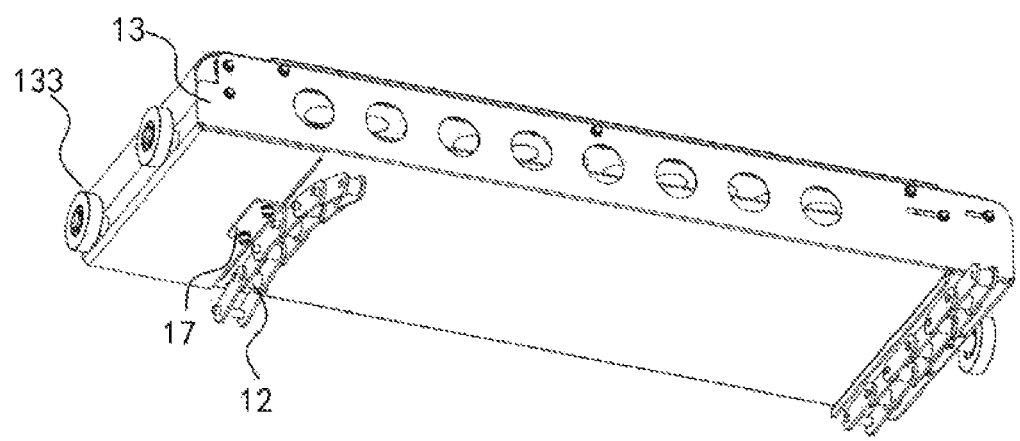
FIG. 6 is a schematic diagram showing the bottom structure of the trolley in FIG. 4.
Figure 7:
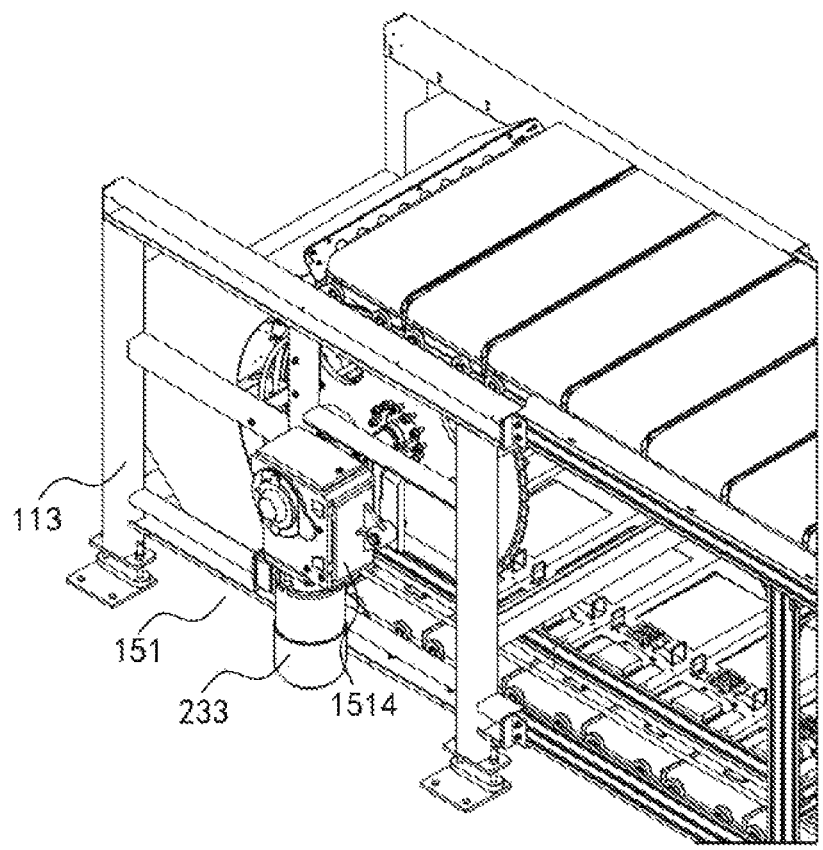
FIG. 7 is a schematic structural diagram of an active roller of a sorting system in an embodiment of the present disclosure.
Figure 8:
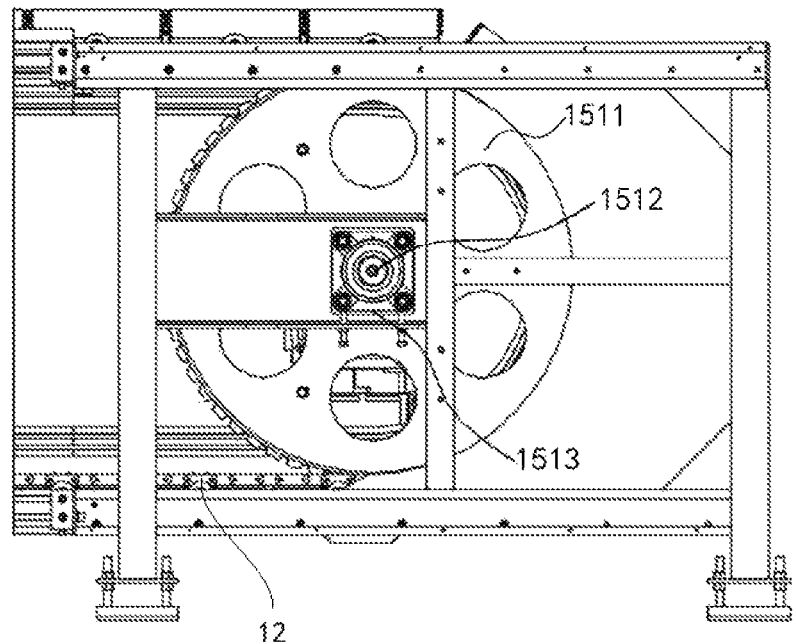
FIG. 8 is a schematic structural view of the other side of the active roller in FIG. 7.
Figure 9:
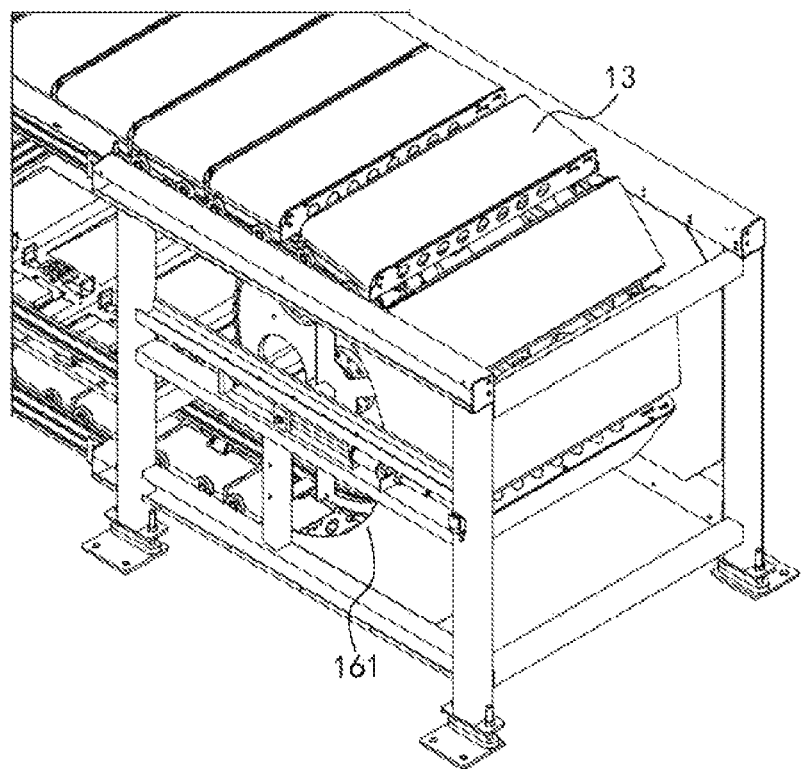
FIG. 9 is a schematic structural diagram of a passive roller of a sorting system in an embodiment of the present disclosure.

References are made to FIGS. 1 to 19 of the present specification. FIG. 1 representatively shows a three-dimensional schematic diagram of the sorting system in the present disclosure. FIGS. 2 to 3 show schematic structural diagrams of the trolley and the rack. FIGS. 4 to 6 show the specific structural diagram of the trolley. FIGS. 7-8 show the structural schematic diagrams of the active roller. FIGS. 9-13 show the structural schematic diagrams of the passive roller. FIG. 14 shows the structural schematic diagram of the package supply mechanism. FIGS. 15-18 show a schematic structural diagram of the control system. It is easy for those skilled in the art to understand that, various modifications, additions, substitutions, deletions or other changes can be made to the following specific embodiments, in order to apply the relevant design of the present disclosure to other application scenarios, and these changes are still falling within the scope of the principle of the sorting system proposed in the present disclosure.

Implementation of the Sorting System

Figure 19:
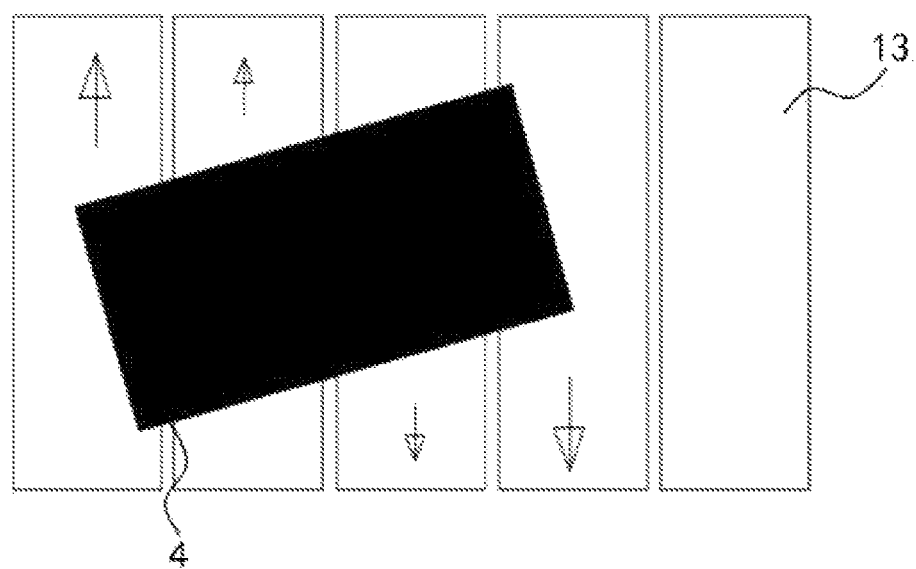
FIG. 19 is a schematic diagram of the position adjustment process of the package by the trolley in an embodiment of the present disclosure.

As shown in FIG. 1 and FIG. 19, in an embodiment, the sorting system proposed in the present disclosure can be used to transport packages 4. As shown in FIG. 1, the sorting system proposed in the present disclosure includes a conveying mechanism 1 and a control system 2. The conveying mechanism 1 includes a rack 11, two rollers 15 and 16, a chain 12 and a plurality of trolleys 13. The two rollers 15 and 16 are arranged on the rack 11 at intervals along the first horizontal direction F. The chain 12 is wound between the two rollers 15 and 16. As shown in FIGS. 1, 5 and 6, the plurality of trolleys 13 are respectively connected to the chain 12 and arranged in sequence along the first horizontal direction F1. Each trolley 13 includes a trolley body 131 and a sorting and conveying mechanism 132 provided on the trolley body 131. The bottom part of the trolley body 131 is connected to the chain 12. The sorting and conveying mechanism 132 is configured to carry and convey packages along a second horizontal direction F2 perpendicular to the first horizontal direction F1. The control system 2 includes a controller 21 connected to the conveying mechanism 1. The controller 21 is configured to control the conveying mechanism 1 to transport the package 4 along the first horizontal direction F1, and is configured to independently control the sorting and conveying mechanism 132 of each trolley 13 to convey the package 4 along the second horizontal direction F2.

With the above design, in the sorting system proposed by the present disclosure, the trolley 13 is transporting in the first horizontal direction F1, transporting above the rack 11, and sorting the package 4 and returning it below the rack 11. Thus, pitch of the trolley 13 can be reduced. For the transportation of smaller packages 4, the transportation resources are saved, and at the same time, the utilization rate of the occupied space is improved. The control system 2 controls the conveying mechanism 1 of the trolley 13 and can independently control the sorting and conveying mechanism 132 of each trolley 13. This helps to realize the automated transportation by the sorting system, saves labor, and can automatically control each trolley 13 to convey packages in the second horizontal direction F2, thereby realizing the more accurate throwing and correction of the package.

The rack 11 extends along the first horizontal direction F1 to provide support for the entire conveying mechanism. The conveying mechanism 1 is a symmetrical structure. The following content in the present disclosure is a description of the structure from one side, and the structure from the other side is symmetrical to it.

The first horizontal direction F1 is the transportation direction of the trolley 13, and the second horizontal direction F2 is the throwing direction of the package. Therefore, the second horizontal direction F2 is perpendicular to the first horizontal direction F1. In addition, the controller 21 in the present disclosure is electrically connected to the conveying mechanism 1. It can be a wired connection, such as through a USB interface, or a wireless connection, such as through Bluetooth or near field communication (NFC), infrared, etc., as long as the signal transmission between the controller 21 and the conveying mechanism 1 can be achieved, which is not limited here.

Furthermore, as shown in FIGS. 2 to 4, in an embodiment, the rack 11 includes a rail for guiding the trolley 13 to slide. The trolley 13 also includes wheels 133, which are arranged on respective sides of the trolley body 131 thereof. In an embodiment, two wheels 133 are provided on one side and one wheel 133 is provided on the other side. Alternatively, two wheels 133 are provided on each side, which is not limited here. The rail may only have an upper rail 111, which is arranged on the inner side of the upper part of the rack 11 and extends along the first horizontal direction F1. The wheels 133 of the trolley 13 are in sliding engagement with the upper rail 111, and the upper rail 111 serves as a support and guide part. Since the bottom part of the trolley 13 is fixedly connected to the chain 12, the trolley 13 can move in the first horizontal direction F1 along with the chain 12. Therefore, the rail can also only have a lower rail 112, which is arranged along the inner side of the lower part of the rack 11, and extends along the first horizontal direction F1. The wheels 133 are slidably fitted with the lower rail 112, and slide along the first horizontal direction F1. Apparently, the rail can also have the above-mentioned upper rail 111 and the lower rail 112 at the same time, so as to provide support and guidance for the wheels 133 of the trolley 13. It should be noted that the wording "inside" of the rack 11 refers to the side of the rack 11 close to its center line along the first horizontal direction F1. In the present disclosure, the trolley 13 is arranged inside the rack 11.

Furthermore, as shown in FIGS. 2 to 3, in an embodiment, the rack 11 further includes an upper cover 114, one side of which is arranged on the rack 11, and the other side of which extends above the upper rail 111 to cover the wheels 133 on the upper rail 111, to prevent foreign objects from falling therein. Specifically, one side of the upper cover 114 may be arranged on the top end of the rack 11 or on the inner side of the rack 11, and the other side of the upper cover 114 may extend along the second horizontal direction F2 to cover the wheels 133.

Furthermore, as shown in FIGS. 4 to 6, in an embodiment, each wheel 133 further includes a wheel body 1331 and a wheel shaft 1332. The wheel shaft 1332 penetrates through the wheel body 1331, and a gap exists between the end of the wheel shaft 1332 close to the rack 11 and the inner side of the rack 11, which gap is set to be 1 to 5 mm. This gap has a small value, so that the rack 11 limits the position of the trolley 13. When the trolley 13 throws a package, the end surface of the wheel shaft can contact the inner side of the rack 11 to prevent the trolley 13 from shaking significantly along the second horizontal direction F2.

Furthermore, as shown in FIG. 3, in an embodiment, the end surface of the wheel shaft 1332 at one end close to the rack 11 is a curved surface, so as to reduce the wearing when the wheel shaft 1332 contacts the inner side of the rack 11.

Furthermore, as shown in FIGS. 2 to 3, in an embodiment, the rack 11 further includes a wear-resistant strip 115. The wear-resistant strip 115 is made of wear-resistant material. The wear-resistant strip 115 is arranged on the inner side of the rack 11 along the first horizontal direction F1 and is located between the upper cover 114 and the upper rail 111, so as to prevent the abrasion caused by the long-term contact between the inner side of the rack 11 and the wheel shaft 1332.

Further, in an embodiment, the wear resistant material of the wear-resistant strip 115 is ultra-high molecular weight polyethylene. Of course, it can also be other wear-resistant materials, which is not limited here.

Further, as shown in FIGS. 1 and 7, the rack 11 in an embodiment further includes shock-absorbing feet 113, which are arranged on respective sides of the rack 11 to support the rack 11. It can be seen from the figures that there are multiple shock-absorbing feet 113, which are arranged on respective sides of the rack 11 and arranged at intervals. This helps to reduce the vibration of each section of the rack 11 and prevent the ground and the equipment platform from being penetrated by the vibration.

Further, as shown in FIGS. 1, 7 to 8, in an embodiment, one of the two rollers 15, 16, for example the roller 15, of the conveying mechanism 1 is an active roller 151, and the other roller is a passive roller 161. The driving roller 151 includes a driving sprocket 1511, a driving shaft 1512, a bearing seat 1513, and a driving motor 1514. The driving sprocket 1511 meshes with the chain 12. The bearing seat 1513 is arranged on the rack 11. The driving shaft 1512 passes through the center part of the driving sprocket 1511, and has two ends passing through the bearing seat 1513. The driving motor 1514 is in a transmission connection with the driving shaft 1512, and is configured to drive the driving shaft 1512 to rotate and drive the driving sprocket 1511 to rotate. That is, the active roller 151 is used to provide power for the entire conveying mechanism 1 and to make the chain 12 rotate.

Specifically, as shown in FIG. 8, in an embodiment, a connecting plate is provided on one side of the rack 11 corresponding to the driving shaft 1512, and a plurality of elongated holes are opened on the connecting plate. The bearing seat 1513 is fixed onto the connecting plate by bolts, and the bolts pass through the elongated holes. In addition, the upper and lower ends of the connecting plate have flanges protruding in the second horizontal direction F2. A threaded hole is opened in the lower flange at a position facing the bearing seat 1513, and at least one height adjustment bolt is pressed against the bottom part of the bearing seat 1513 through the threaded hole. On the one hand, the height adjustment bolt provides support for the bearing seat 1513. On the other hand, according to actual needs, when installing the driving shaft 1512 and the bearing seat 1513, the height of the bearing seat 1513 can be adjusted along the elongated hole and then tightened. The height adjustment bolt realizes the fine adjustment of the height of the driving shaft 1512, so that a good running effect is achieved by the sprocket.

Further, as shown in FIG. 6, the conveying mechanism 1 further includes a connecting piece 17 through which the chain 12 is connected to the bottom part of the trolley 13. Specifically, the connecting piece 17 may be a right-angle connecting plate, and the chain 12 is connected to the bottom part of the trolley 13 by bolts.

It should be noted that the chain 12 is connected to the bottom part of the trolley 13 through the connecting piece 17. The "bottom part" in the present disclosure refers to the part near the chain 12 when the trolley 13 runs along the first horizontal direction F1 on the upper rail 111. When the trolley 13 runs along the first horizontal direction F1 on the lower rail 112, the "bottom part" of the trolley 13 is still the side close to the chain 12, not the side close to the bottom surface.

Further, as shown in FIGS. 9 to 12, in an embodiment, one of the two rollers 15 and 16 of the conveying mechanism 1 is an active roller 151, and the other is a passive roller 161. The passive roller 161 includes a tension sprocket 1611, a tension shaft 1612 and a tension assembly 1613. The tension sprocket 1611 meshes with the chain 12. The tension shaft 1612 passes through the center part of the tension sprocket 1611. The tension assembly 1613 is connected to the end of the tension shaft 1612, and is configured to adjust the tension degree of the chain 12 by adjusting the displacement of the tension shaft 1612 in the first horizontal direction F1.

Further, as shown in FIGS. 9 to 12, in an embodiment, the tension assembly 1613 includes a sliding rail 16131, a tension spring 16134, a tension rod 16136, and an elasticity adjustment component 16137.

Figure 12:
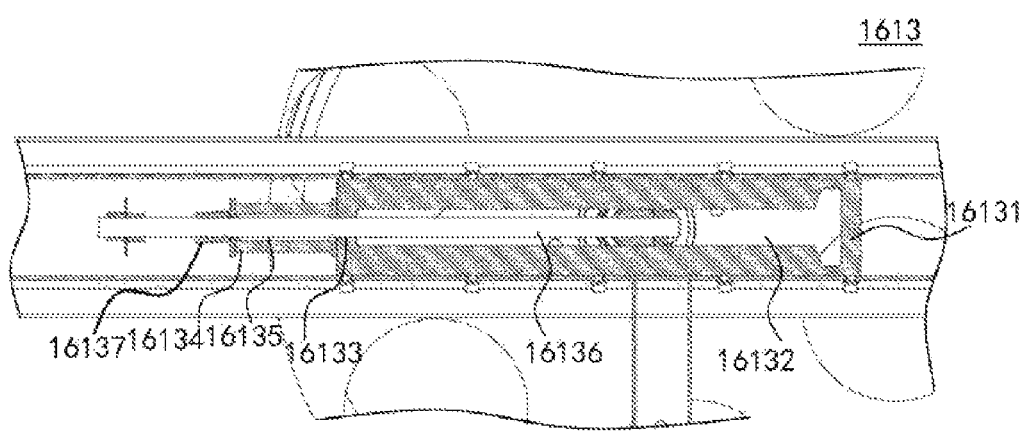
FIG. 12 is a cross-sectional view of the tension assembly of the passive roller in FIG. 9.

The sliding rail 16131 is fixedly arranged on the rack 11 along the first horizontal direction F1, as shown in FIG. 12. In one embodiment, the sliding rail 16131 is connected to the rack 11 by bolts. The sliding rail 16131 is provided with a sliding groove 16132 penetrating along the second horizontal direction F2, and the end of the tension shaft 1612 penetrates through the sliding groove 16132 along the second horizontal direction F2. The sliding rail 16131 is further provided with an opening 16133 at one end away from the active roller 151, and the opening 16133 is in a communication connection with the sliding groove 16132.

Figure 10:
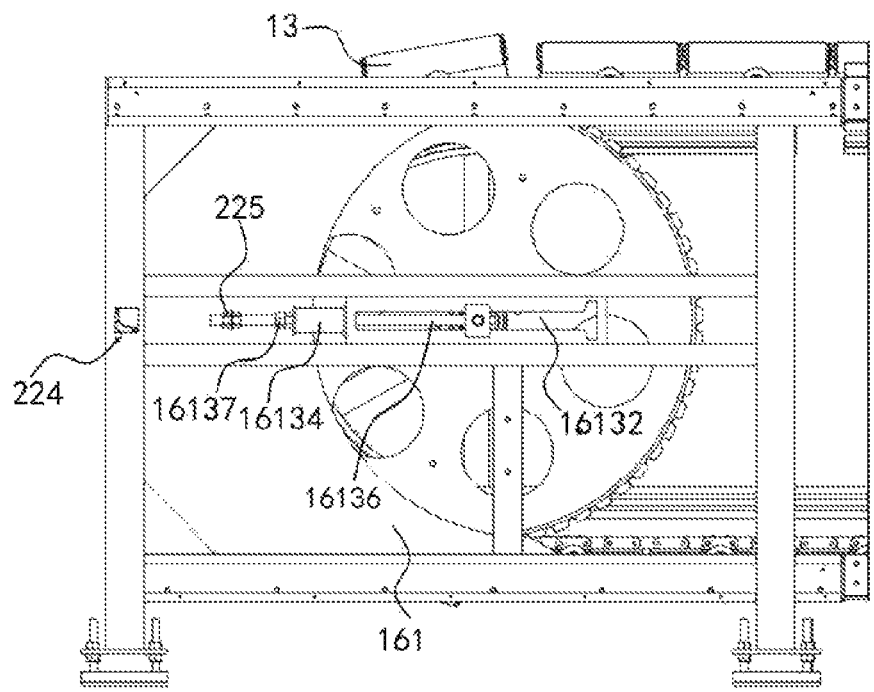
FIG. 10 is a schematic structural diagram of the passive roller in FIG. 9 as seen from another angle.
Figure 11:
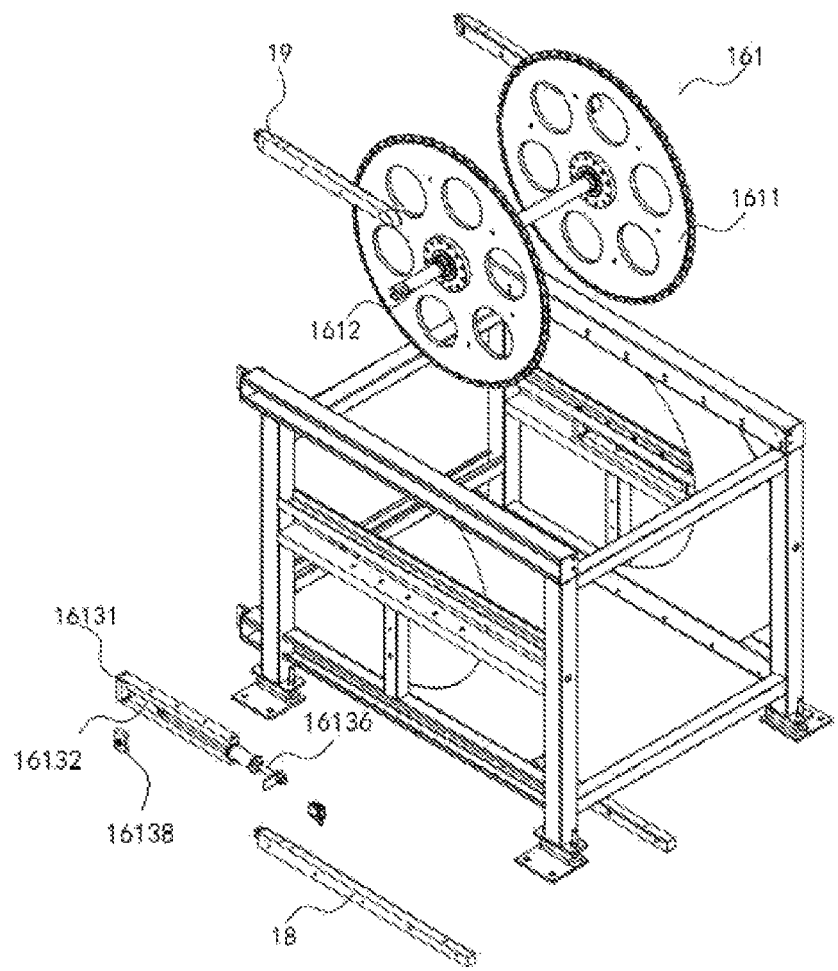
FIG. 11 is an exploded structural schematic diagram of the passive roller in FIG. 9.

Further, as shown in FIGS. 10 and 11, the tension assembly 1613 further includes a baffle 16138 connected to the end surface of the tension shaft 1612. The baffle 16138 is provided on the side of the sliding rail 16131 away from the tension sprocket 1611, and the size of the baffle 16138 in the vertical direction is larger than the width of the sliding groove 16132. The purpose of setting the baffle 16138 here is to prevent the tension shaft 1612 from sliding out from the side of the sliding groove 16132, and the baffle 16138 plays a guiding role. Specifically, as shown in FIGS. 10 and 11, the cross-sectional shape of the baffle 16138 is C-shaped, and two guide grooves are provided on both the upper and lower sides of the sliding groove 16132 of the slide rail 16131, which are used to mate with the two sides of the baffle 16138. It should be noted that, in an embodiment, the vertical direction refers to a direction perpendicular to and away from the ground.

The tension spring 16134 is connected to one end of the sliding rail 16131 with the opening 16133 along the first horizontal direction F1. The tension spring 16134 has a cavity 16135 extending along the first horizontal direction F1, and the cavity 16135 is in communication with the opening 16133.

The tension rod 16136 passes through the cavity 16135 of the tension spring 16134 and the sliding groove 16132 of the sliding rail 16131 in sequence along the first horizontal direction F1. The end of the tension rod 16136 located in the sliding groove 16132 of the sliding rail 16131 is defined as the first end, and the other end of the tension rod 16136 located in the sliding groove 16132 is defined as the second end. The first end of the tension rod 16136 is connected to the end of the tension shaft 1612. When the tension rod 16136 moves along the first horizontal direction F1, the end of the tension shaft 1612 can be driven to slide along the first horizontal direction F1 in the sliding groove 16132. The second end of the tension rod 16136 extends out of the tension spring 16134. Reference is made to FIG. 12. In an embodiment, the cross section of the sliding groove 16132 is T-shaped. Specifically, it is a shape obtained after the T-shaped cross section is rotated 90° clockwise. The sliding groove 16132 can be divided into a first through groove and a second through groove. The first through groove is a rectangle shape extending in the first horizontal direction F1, and the second through groove is a rectangle shape extending in the vertical direction (a direction perpendicular to the ground). The first through groove and the second through groove are in communication with each other. The width of the rectangle-shaped first through groove matches the size of the tension shaft 1612, so that the tension shaft 1612 can slide along the upper and lower sides of the rectangle-shaped first through groove to limit the tension shaft 1612 in position and prevent the tension shaft 1612 from swaying up and down in the vertical direction. The second through groove extends in the vertical direction. The purpose is to facilitate the assembly of the tension rod 16136 and the tension shaft in the second through groove, completing the connection, and then moving into the first through groove.

The surface of the tension rod 16136 has threads. For example, the tension rod 16136 is a screw, and one end of the screw is fixedly connected to the tension shaft 1612. The tension rod 16136 may also be a threaded rod. Of course, in one embodiment, the tension rod 16136 may be a rod without threads, as long as one end of the tension rod can be fixedly connected to the shaft 9, which is not limited here.

The elasticity adjustment component 16137 is arranged at one end of the tension spring 16134 away from the sliding rail 15231, connects the tension rod 16136 and the tension spring 16134, and compresses or stretches the tension spring 16134. The elasticity adjustment component 16137 may be a nut. As shown in FIG. 12, in an embodiment, the tension spring 16134 is initially in a compressed state to provide pre-tension force for the tension rod 16136. The elasticity adjustment component 16137 can adjust the compression length of the spring, thereby adjusting the magnitude of the pre-tension force. When the chain 12 becomes loose, the tension spring 16134 will elongate, driving the tension rod 16136 to move away from the active roller 151, and then driving the tension shaft 1612 to slide along the sliding groove 15232 to tension the chain 12. In another embodiment, when the tension assembly 1613 is installed in a direction opposite to the first horizontal direction F1 in FIGS. 11 and 12, it can be set to stretch the tension spring 16134 to provide pre-tension force in the same direction. Therefore, the tension assembly 1613 of the present disclosure can automatically perform tension compensation after the chain 12 is stretched due to long-term operation, so as to avoid undesirable phenomena caused by the chain 12 being slack, out of gear or jumping gear and the like.

Figure 13:
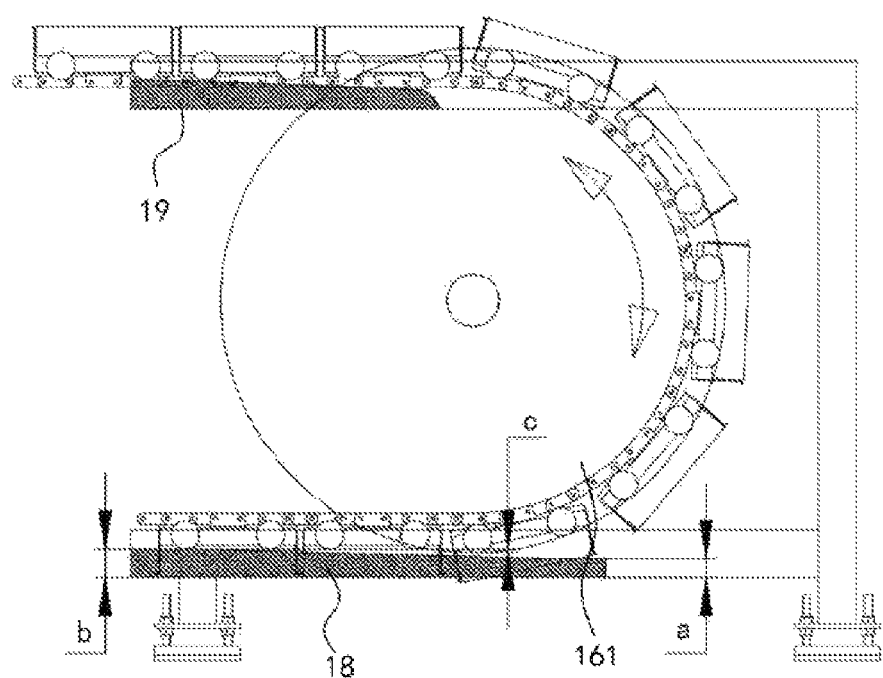
FIG. 13 is a schematic diagram of the connection structure between the shock-absorbing rail and the passive roller in an embodiment of the present disclosure.
Figure 14:
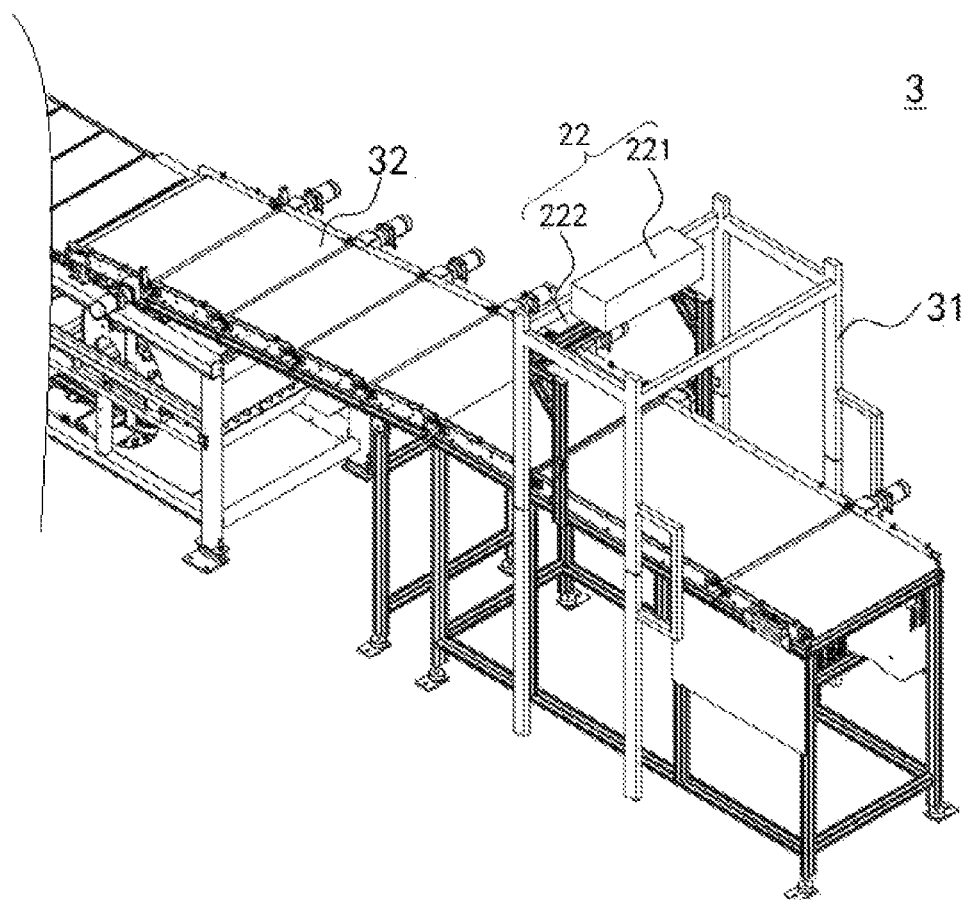
FIG. 14 is a schematic structural diagram of a package supply mechanism in an embodiment of the present disclosure.

Further, as shown in FIGS. 11 and 13, in an embodiment, the conveying mechanism 1 further includes a first shock-adsorbing rail 18 and/or a second shock-adsorbing rail 19. The first shock-adsorbing rail 18 is arranged inside the rack 11 and extends along the end of the lower rail 112. The upper surface of the first shock-adsorbing rail 18 is gradually reduced from the upper surface of the lower rail 112 to a wedge-shaped surface, so that the wheels of the trolley 13 133 are transitioned to the lower rail 112 for sliding. The second shock-absorbing rail 19 is arranged inside the rack 11 and extends along the end of the upper rail 111. The upper surface of the second shock-absorbing rail 19 is gradually reduced from the upper surface of the upper rail 111 to a wedge-shaped surface, so that the wheels of the trolley 13 are transitioned to the upper rail 111 for sliding. As shown in FIG. 13, when the trolley 13 rotates back from the driving sprocket 1511 or the tension sprocket 1611, and the line connecting the wheels 133 of the trolley 13 and the axle center of the driving sprocket 1511 or the tension sprocket 1611 is perpendicular to the ground, the wheels 133 of the trolley 13 are at the lowest position, and the distance below the lowest position of the wheels 133 in the horizontal section is c. The height of the connection part between the first shock-adsorbing rail 18 and the second shock-adsorbing rail 19 and the upper rail 111 or the lower rail 112 is a, and the height of the ends thereof is b, wherein a>b. The wheels 133 of the trolley 13 are transitioned to the upper rail 111 or the lower rail 112 through the first shock-adsorbing rail 18 and the second shock-adsorbing rail 19, so as to prevent the wheels 133 from directly colliding with the upper rail 111 or the lower rail 112, thereby reducing noise and protecting the trolley 13. Reference is made to FIG. 1. When the transport direction of the trolley 13 is from the passive roller 161 to the active roller 151, in one embodiment, the first anti-vibration rail is arranged on the lower rail 112 corresponding to the active roller 151, and the second anti-vibration rail is arranged on the upper rail 111 corresponding to the passive roller 161. Of course, the first anti-vibration rail and the second anti-vibration rail can also be arranged at the lower rail 112 and the upper rail 111 corresponding to the active roller 151 and the lower rail 112 and the upper rail 111 corresponding to the passive roller 161. When adjustment is made to the transport direction of the trolley 13, the shock absorption effect can be achieved. In an embodiment, only the first shock-adsorbing rail 18 may be provided, or only the second shock-adsorbing rail 19 may be provided, which is not limited here according to actual needs.

Further, in an embodiment, materials of the first shock-adsorbing rail 18 and the second shock-adsorbing rail 19 are both ultra-high molecular weight polyethylene with high wear resistance.

Further, as shown in FIG. 14, in an embodiment, the sorting system further includes a package supply mechanism 3, and the package supply mechanism 3 includes a package supply rack 31 and a package supply belt 32. The package supply belt 32 is arranged on the package supply rack 31 and is configured to transport the package 4 to the trolley 13.

Furthermore, as shown in FIG. 2, the conveying mechanism 1 of the sorting system further includes a guide table 14, corresponding to each throwing grid and arranged on respective sides of the rack 11, wherein the package has been led out of the conveying mechanism through the throwing opening.

Further, as shown in FIGS. 15 to 19, in an embodiment, the control system 2 further includes a data acquisition module 22. The data acquisition module 22 includes a code scanner 221. The code scanner 221 is configured to collect the sorting information of the package 4. The controller 21 is connected to the code scanner 221. Based on the sorting information collected by the code scanner 221, the controller 21 can determine the throwing grid of the package 4 to be delivered, and control the movement of the conveying mechanism 1 along the first horizontal direction F1 and the movement of the sorting and conveying mechanism 132 of each trolley 13 along the second horizontal direction F2, causing the package 4 to be thrown to the designated throwing grid. Reference is made to FIG. 2, where a guide table 14 is also provided for exporting the package 4 to the conveying mechanism. The throwing grid designated in the present disclosure refers to the grid corresponding to the guide table, which is used to transfer the package 4 from the trolley to the guide table 14.

Specifically, in an embodiment, the code scanner 221 can be set on the package supply rack 31 or on the rack 11 of the conveying mechanism, as long as the sorting information of the package 4 can be read before transportation. It is not limited here. The code scanner 221 reads the label on the package and sends the sorting information on the label to the controller 21. The controller 21 obtains the destination grid of the package 4 from its internal database according to the sorting information, and then controls the conveying mechanism 1 to transport the package 4 to the destination grid. After that, the sorting and conveying mechanism 132 on the trolley 13 carrying the package is separately controlled to move along the second horizontal direction F2 to throw the package.

Reference is made to FIG. 5. In an embodiment, the sorting and conveying mechanism 132 on the trolley 13 includes two rollers and a conveying belt 1323 wound on the two rollers. One of the two rollers is a driving roller 1321 and the other is a tension roller 1322. The driving roller 1321 and the tension roller 1322 are both arranged on the trolley body 131 and they are arranged at intervals. The controller 21 is electrically connected to the driving roller 1321, and controls start, stop, and adjustment of the rotation speed and rotation direction of the driving roller 1321, so as to control the forward or reverse movement of the conveying belt 1323 in the second horizontal direction F2, thereby adjusting the position of the package 4 and putting the package 4 in a proper orientation (as shown in FIG. 19). Regarding how the controller 21 is electrically connected to the driving roller 1321 and how to realize the control of the driving roller 1321, those skilled in the art can implement according to related technologies. For example, an encoder can be provided on each driving roller 1321, and a control signal can be received from the controller 21, or other means can be used, which will not be repeated here. Therefore, the controller 21 can control start, rotation speed and rotation direction of the driving roller 1321 on the trolley 13 according to the sorting information collected by the code scanner 221, and make sure the package 4 is thrown to the correct grid.

Further, as shown in FIGS. 15 to 19, in an embodiment, the data acquisition module 22 further includes a position sensor 222, which is configured to detect the first position information of the package 4 at the initial position. The controller 21 is connected to the position sensor 222 and independently controls the sorting and conveying mechanism 132 of each trolley 13 according to the first position information of the package 4 so as to adjust the position of the package 4.

Specifically, in an embodiment, the position sensor 222 can be arranged on the package supply rack 31 or on the rack 11 of the conveying mechanism, as long as the first position information of the package 4 can be read, and it is not limited here. The first position information may include the size of the package 4, the size offset from the center line of the trolley 13 along the first horizontal direction F1 (that is, when the package is in a skewed state), and the like. The position sensor 222 sends such position parameter to the controller 21, and the controller 21 independently controls the movement of the sorting and conveying mechanism 132 of the trolley 13 carrying the package 4 in the second horizontal direction F2 according to the first position information. As shown in FIG. 19, the controller 21 controls the activation of the driving roller of the respective trolley 13 according to the first position information, and adjusts the rotation speed, rotation direction of the driving roller of each trolley 13 and also the displacement of the conveying belt along the second horizontal direction F2, so as to move the package 4 to the middle position of the trolley 13. That is, the center line of the package 4 and the center line of the trolley 13 coincide in the first horizontal direction F1.

Further, in an embodiment, the data acquisition module 22 further includes a detection sensor (not shown in the figures), which is configured to detect the second position information of the package 4 at the adjustment position. It may be that after the initial position of the package 4 is adjusted, it is transported to the adjustment position, and the position is adjusted for a second time. The controller 21 is electrically connected to the detection sensor, and independently controls the sorting and conveying mechanism 132 of each trolley 13 according to the second position information of the package 4 to assist in adjusting the position of the package 4. The function of the detection sensor is to collect for a second time the position parameters of the package that has been adjusted, and send the position parameter information to the controller 21. If the controller 21 determines that the package 4 is still in a skewed state, it will further adjust the driving roller of the respective trolley 13, so as to adjust the package 4 to the middle position of the trolley 13. If the package 4 is still in a skewed state after re-adjustment, it can be manually adjusted or dropped in advance or later.

The initial position refers to a position where the package 4 is placed on the sorting trolley and has not yet been transported, or placed on another mechanism capable of transporting the package to the sorting trolley 13, such as the package supply rack 31. The adjustment position refers to a position where the package 4 is located after being transported for a certain period of time from the initial position. Such period of time is not a specific value, and it can be adjusted according to actual conditions.

For example, in an embodiment, the position sensor 222 may be arranged on the package supply rack 31 of the sorter, and the package 4 is first placed on the package supply belt 32 (at the initial position). The position sensor 222 collects the position parameter (or the first position information) of the package 4 and sends it to the controller 21. The multiple sorting trolleys 13 located on the sorter rack can be divided into an adjustment area and a transportation area along the first horizontal direction F1. The package 4 is transported to the adjustment area (or the adjustment position) via the package supply belt 32. The controller 21 controls the electric roller of the corresponding sorting trolley 13 to adjust the position of the package 4 in the adjustment area. After that, the detection sensor detects the adjusted position parameter (or the second position information) of the package. If the adjusted position parameter meets the requirements for putting the package in a proper orientation, the controller 21 controls the conveying mechanism 1 to transport the package 4 to the transportation area. If the adjusted position parameter does not meet the requirements for putting the package in a proper orientation, the controller 21 will re-control the electric roller to adjust the position of the package 4 according to the adjusted position parameter (or the second position information). In an embodiment, the detection sensor may be a detection camera, which is arranged directly above the adjustment area, takes a picture of the package, and sends the image information to the controller 21. Alternatively, the detection sensor may also be an encoder, which is arranged on each sorting trolley 13 to detect the position parameter of the package on the sorting trolley 13 and send the position parameter to the controller 21. Therefore, the sorting trolley 13 in the present disclosure can realize the automatic position adjustment of the package, so that the throwing and dropping is more accurate, and at the same time, the amount of manual labor is saved.

Further, as shown in FIG. 10, in an embodiment, the data acquisition module 22 further includes a tension sensor 224. The tension sensor 224 is arranged on the rack 11, electrically connected to the controller 21, opposite to the tension assembly 1613 in the first horizontal direction F1, and configured to detect the distance between the tension sensor 224 and the tension assembly 1613. The distance is sent to the controller 21 in the form of an electric signal. At the same time, the tension sensor 224 can also detect the distance X moved by the tension sprocket 1611 due to the looseness of the chain 12. If it is detected that the difference in the distance X between the two sides of the tension sprocket 1611 is large, it means that the chains 12 are inconsistent in stretching on both sides, and the chain 12 of the device needs to be adjusted to prevent further damage to the device.

Further, continuing referring to FIG. 10, in an embodiment, the data acquisition module 22 further includes a sensing piece 225. The sensing piece 225 is disposed at the second end of the tension rod 16136. The tension sensor 224 is opposite to the sensing piece 225 in the first horizontal direction F1, and is configured to detect the distance between the tension sensor and the sensing piece 225. The controller 21 determines the amount of deformation of the tension spring 16134 according to the distance. When the tension spring 16134 stretches too long and the elastic force decreases, it will issue a prompt and notify the staff to make adjustments accordingly.

Furthermore, as shown in FIG. 3, the data acquisition module 22 further includes a first-trolley sensing piece 231 and a first-trolley detection sensor 232. The first-trolley sensing piece 231 and the first-trolley detection sensor 232 are installed on any trolley 13, and the first-trolley sensing piece 232 is connected to the controller 21. When the conveying mechanism 1 starts to operate, the first-trolley sensing piece 232 will trigger the first-trolley sensor 231 at regular intervals. By providing the first-trolley detection sensor 232, the position of the first trolley at the trigger time can be known, and the controller 21 can calculate the accurate position of any other trolley 13 at the trigger time. The calculation method is as follows, where it is supposed that the pitch of the chain 12 is P, and every N links of the chain 12 are connected to the bottom part of the trolley 13 through the connecting piece 17. Thus, the initial pitch of the trolley 13 can be obtained as P0=N*P, where N is a positive integer, and 1≤N≤20. In an embodiment, P=50.8 and N=6. In addition, the tension sensor 224 needs to sense the distance X moved by the tension sprocket 1611 and send it to the controller 21. Assuming that the number of trolleys 13 is N1, the pitch P1 of two adjacent trolleys 13 is 2X/N1+P0, and the distance from the first one to the last one among N adjacent trolleys 13 is N*P1.

Further, referring to FIG. 7, in an embodiment, a driving encoder 233 is also provided on the driving motor 1514, and the driving encoder 233 is connected to the controller 21 for detecting and controlling the rotation speed of the driving sprocket 1511.

Figure 15:
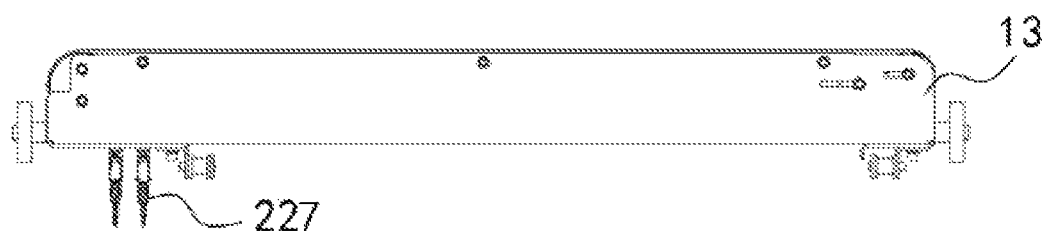
FIG. 15 is a schematic structural diagram of the electric pickup set provided on the trolley in an embodiment of the present disclosure.
Figure 16:
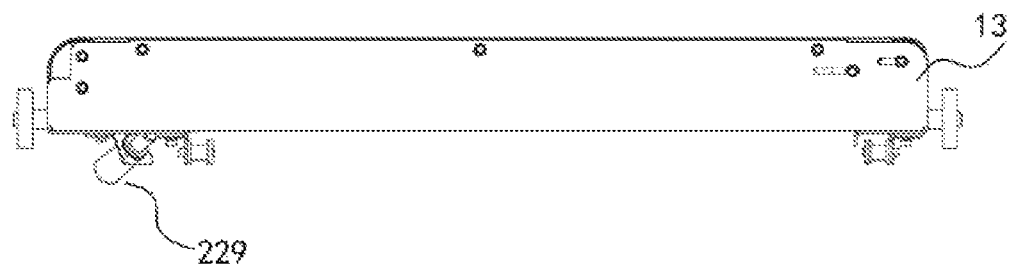
FIG. 16 is a schematic structural diagram of the signal transceiver installed on the trolley in an embodiment of the present disclosure.
Figure 17:
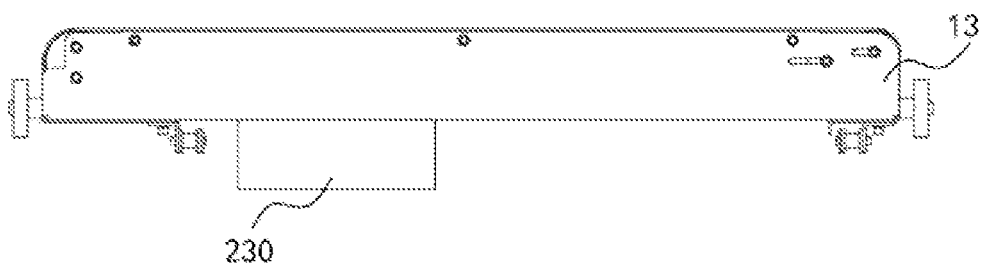
FIG. 17 is a schematic structural diagram of the actuator installed on the trolley in an embodiment of the present disclosure.
Figure 18:
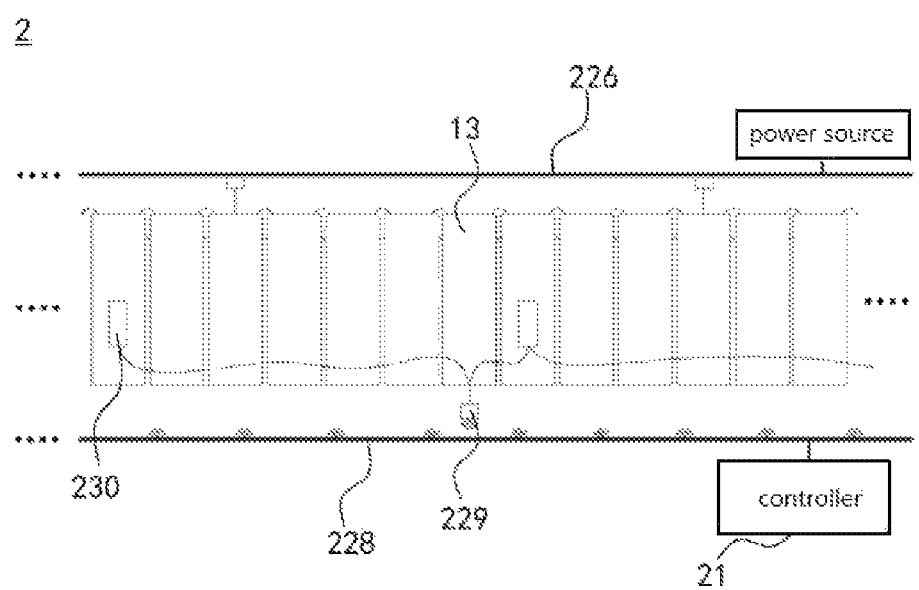
FIG. 18 is a structural diagram of a control system in an embodiment of the present disclosure.

The specific structure and connection relationship between the control system 2 and the conveying mechanism 1 in an embodiment will be described in detail below. Referring to FIG. 18, where two sides of the rack 11 are respectively provided with a sliding contact wire 226 and an external antenna 228. The sliding contact wire 226 is connected to a power source to provide power for the sorting system. The external antenna 228 is connected to the controller 21 and used for transmitting the command signal of the controller 21. Reference is made to FIG. 15, where at least one of the trolleys 13 is provided with an electric pickup set 227 at the bottom part of the trolley 13. The electric pickup set 227 is in contact with the sliding contact wire 226, so as to obtain power from the sliding contact wire 226 and supply it to other trolleys 13. A power line can be set between the trolleys 13, and one trolley 13 can supply power to multiple trolleys 13. Reference is made to FIG. 16, where a signal transceiver 229 is provided at the bottom part of at least one of the trolleys 13. The signal transceiver 229 may be an encoder, and the signal transceiver 229 may cooperate with the external antenna 228 for receiving and sending instruction signals from the controller 21, so as to realize the communication between the trolley 13 and the controller 21. Reference is made to FIG. 17, where an actuator 230 is provided at the bottom part of at least one of the trolleys 13. The actuator 230 can receive an instruction signal from the controller 21 to control the start and stop of the driving rollers of the plurality of trolleys 13. One actuator 230 can be connected with the driving rollers of multiple trolleys 13.

Apparently, the above-mentioned signal transceiver 229 and actuator 230 may not be provided separately, and the controller 21 may have modules integrating the functions of the two devices, so that the controller 21 can perform direct control. Those skilled in the art can easily ascertain how to realize the signal transmission between the controller 21, the actuator 230, and the signal transceiver 229. For example, the controller 21 can be a microprocessor, and its functions can be realized according to the internal program thereof. This will not be repeated here.

In the sorting system of the present disclosure, the trolley 13 is transported in the first horizontal direction F1, and the packages are sorted above the rack 11, and returned below the rack 11. This can reduce the pitch of the trolley 13, and save the transportation resources for smaller packages. At the same time, the utilization rate of occupied space is improved. The control system 2 controls the conveying mechanism 1 of the trolley 13 to transport the packages in the first horizontal direction F1, and can independently control the sorting and conveying mechanism 132 of each trolley 13 to transport the packages in the second horizontal direction F2. This helps to realize the automated transportation of the sorting system, saves labor, and can automatically control the transportation of each trolley 13 in the second horizontal direction F2. Thus, the more accurate throwing and correction of the package is realized.

Exemplary embodiments of the sorting system proposed by the present disclosure are described and/or illustrated above in detail. However, the embodiments of the present disclosure are not limited to the specific embodiments described herein. On the contrary, the components and/or steps of each embodiment can be used independently and separately from other components and/or steps described herein. Each component and/or step of one embodiment can also be used in combination with other components and/or steps of other embodiments. When introducing the elements/components/etc. described and/or illustrated herein, the terms "a", "an", and "above" are used to indicate that there are one or more elements/components/etc. The terms "comprising", "including" and "having" are used to mean open-ended inclusion, which means that there may be additional elements/components/etc. in addition to the listed elements/components/etc. In addition, the terms "first" and "second" in the claims and specification are used only as marks, and are not numerical limitations on their objects.

Although the sorting system proposed in the present disclosure has been described according to different specific embodiments, those skilled in the art will recognize that the implementation of the present disclosure can be modified within the spirit and scope of the claims.

The invention claimed is:

1. A sorting system for transporting a package (4), the sorting system comprising:
    a conveying mechanism (1), comprising:
    a rack (11);
    two rollers (15, 16), arranged on the rack (11) at intervals along a first horizontal direction (F1);
    a chain (12), wound around the two rollers (15, 16); and
    a plurality of trolleys (13), connected respectively to the chain (12) and arranged sequentially along the first horizontal direction (F1), wherein each trolley (13) comprises a trolley body (131) and a sorting and conveying mechanism (132) arranged on the trolley body (131), a bottom part of the trolley body (131) is connected to the chain (12), and the sorting and conveying mechanism (132) is configured to carry and convey the package (4) along a second horizontal direction (F2) perpendicular to the first horizontal direction (F1); and
    a control system (2), comprising a controller (21) connected to the conveying mechanism (1), wherein the controller (21) is configured to control the conveying mechanism (1) to convey the package (4) along the first horizontal direction (F1), and the controller (21) is configured to independently control the sorting and conveying mechanism (132) of each trolley (13) to convey the package (4) along the second horizontal direction (F2),
    wherein one of the two rollers (15, 16) is an active roller (151), and the other of the two rollers (15, 16) is a passive roller (161),
    wherein the active roller (151) comprises:
    a driving sprocket (1511), meshing with the chain (12);
    a bearing seat (1513), arranged on the rack (11);
    a driving shaft (1512), passing through a center part of the driving sprocket (1511), and having both ends passing through the bearing seat (1513); and
    a driving motor (1514), in a transmission connection with the driving shaft (1512) and configured to drive the driving shaft (1512) to rotate and drive the driving sprocket (1511) to rotate.

2. The sorting system according to claim 1, wherein the sorting and conveying mechanism (132) comprises:
    a driving roller (1321), arranged on the trolley body (131);
    a tension roller (1322), arranged on the trolley body (131) and spaced apart from the driving roller (1321); and
    a conveying belt (1323), wound around the driving roller (1321) and the tension roller (1322), wherein the controller (21) is configured to control the driving roller (1321) such that a forward or reverse movement of the conveying belt (1323) in the second horizontal direction (F2) is controlled to adjust position of the package (4).

3. The sorting system according to claim 1, wherein each trolley (13) further comprises wheels (133) arranged on respective sides of the trolley body (131), the rack (11) comprises an upper rail (111) arranged on an inner side of an upper part of the rack (11), and the wheels (133) are slidingly fitted with the upper rail (111).

4. The sorting system according to claim 1, wherein each trolley (13) further comprises wheels (133) arranged on respective sides of the trolley body (131), the rack (11) comprises a lower rail (112) arranged on an inner side of a lower part of the rack (11), and the wheels (133) are slidingly fitted with the lower rail (112).

5. The sorting system according to claim 3, wherein each wheel (133) comprises:
a wheel body (1331);
a wheel shaft (1332), penetrating the wheel body (1331), wherein a gap between an end of the wheel shaft (1332) close to the rack (11) and an inner side of the rack (11) is 1-5 mm.

6. The sorting system according to claim 5, wherein an end surface of the wheel shaft (1332) at an end close to the rack (11) is a curved surface.

7. The sorting system according to claim 3, wherein the rack (11) further comprises:
an upper cover (114), having one side arranged on the rack (11) and the other side extending above the upper rail (111) to cover the wheels (133) on the upper rail (111); and
a wear-resistant strip (115) made of wear-resistant material, wherein the wear-resistant strip (115) is arranged on an inner side of the rack (11) along the first horizontal direction (F1), located between the upper cover (114) and the upper rail (111), and configured to prevent the wheel shaft (1332) and an inner side of the rack (11) from wearing.

8. The sorting system according to claim 1, wherein the rack (11) further comprises: shock-absorbing feet (113), arranged on respective sides of the rack (11) to support the rack (11).

9. The sorting system according to claim 1, wherein the conveying mechanism (1) further comprises a connecting piece (17), and the chain (12) is connected to a bottom part of each trolley (13) through the connecting piece (17).

10. The sorting system according to claim 1, wherein the passive roller (161) comprises:
a tension sprocket (1611), meshing with the chain (12);
a tension shaft (1612), passing through a center part of the tension sprocket (1611); and
a tension assembly (1613), connected to an end of the tension shaft (1612) and configured to adjust a tension degree of the chain (12) by adjusting a displacement of the tension shaft (1612) along the first horizontal direction (F1).

11. The sorting system according to claim 10, wherein the tension assembly (1613) comprises:
a sliding rail (16131), arranged on the rack (11) along the first horizontal direction (F1), and provided with a sliding groove (16132);
a tension spring (16134), connected to an end of the sliding rail (16131) along the first horizontal direction (F1);
a tension rod (16136), passing through the sliding rail (16131) and the tension spring (16134) sequentially along the first horizontal direction (F1); and
an elasticity adjustment component (16137), arranged at an end of the tension spring (16134) away from the sliding rail (16131), connecting the tension rod (16136) with the tension spring (16134), and compressing or stretching the tension spring (16134), wherein
an end of the tension rod (16136) is connected to the tension shaft (1612), and an end of the tension shaft (1612) is slidably arranged in the sliding groove (16132).

12. The sorting system according to claim 4, wherein the conveying mechanism (1) further comprises:
a first shock-absorbing rail (18), arranged inside the rack (11) and extending along an end of the lower rail (112), wherein an upper surface of the first shock-absorbing rail (18) is gradually reduced to a wedge-shaped surface from an upper surface of the lower rail (112), so that the wheels (133) of each trolley (13) are transitioned to the lower rail (112) for sliding.

13. The sorting system according to claim 3, wherein the conveying mechanism (1) further comprises:
a second shock-absorbing rail (19), arranged inside the rack (11) and extending along an end of the upper rail (111), wherein an upper surface of the second shock-absorbing rail (19) is gradually reduced to a wedge-shaped surface from an upper surface of the upper rail (111), so that the wheels (133) of each trolley (13) are transitioned to the upper rail (111) for sliding.

14. The sorting system according to claim 1, wherein the control system (2) further comprises:
a data acquisition module (22), comprising a code scanner (221) electrically connected to the controller (21), wherein the data acquisition module (22) is configured to acquire sorting information of the package (4) and transmit it to the controller (21), wherein
the controller (21) is configured to control the rollers (15, 16) and the sorting and conveying mechanism (132) of each trolley (13) according to the sorting information, so that the package (4) is thrown to a designated throwing grid.

15. The sorting system according to claim 14, wherein the data acquisition module (22) further comprises:
a position sensor (222), electrically connected to the controller (21), and configured to detect first position information of the package (4) at an initial position, wherein
the controller (21) is configured to separately control the sorting and conveying mechanism (132) of each trolley (13) according to the first position information to adjust position of the package (4).

16. The sorting system according to claim 14, wherein the data acquisition module (22) further comprises:
a detection sensor, electrically connected to the controller (21), and configured to detect second position information of the package (4) at an adjustment position, wherein
the controller (21) is configured to control the sorting and conveying mechanism (132) of each trolley (13) according to the second position information of the package (4) to assist in adjusting position of the package (4).

17. The sorting system according to claim 16, wherein one of the two rollers (15, 16) is an active roller (151), and the other of the two rollers (15, 16) is a passive roller (161), wherein the passive roller (161) comprises a tension shaft (1612) and a tension assembly (1613), wherein the tension assembly (1613) is connected to an end of the tension shaft (1612) and configured to adjust a tension degree of the chain (12) by adjusting a displacement of the tension shaft (1612) along the first horizontal direction (F1), and the data acquisition module (22) further comprises:

a tension sensor (224), connected to the controller (21), arranged on the rack (11), being opposite to the tension assembly (1613) in the first horizontal direction (F1), and configured to detect a distance between the tension sensor and the tension assembly (1613).

18. The sorting system according to claim 17, wherein the tension assembly (1613) comprises:

a tension rod (16136), arranged along the first horizontal direction (F1), and having two ends, respectively a first end and a second end, wherein the first end is connected to an end of the tension shaft (1612), so that the end of the tension shaft (1612) slides along the first horizontal direction (F1); and the data acquisition module (22) further comprises:

a sensing piece (225), arranged at the second end of the tension rod (16136), wherein the tension sensor (224) is opposite to the sensing piece (225) in the first horizontal direction (F1) and configured to detect a distance between the tension sensor and the sensing piece (225).

19. The sorting system according to claim 1, further comprising:

a package supply mechanism (3), comprising:

a package supply rack (31); and a package supply belt (32), arranged on the package supply rack (31) and configured to transport the package (4) to the trolleys (13).

* * * * *